United States Patent [19]
Noone et al.

[11] Patent Number: 5,284,184
[45] Date of Patent: Feb. 8, 1994

[54] CORRUGATED MULTI-LAYER TUBING HAVING AT LEAST ONE FLUOROPLASTIC LAYER

[75] Inventors: David L. Noone, Southfield; Frank L. Mitchell, Rochester, both of Mich.

[73] Assignee: ITT Corporation, New York, N.Y.

[21] Appl. No.: 962,300

[22] Filed: Oct. 16, 1992

Related U.S. Application Data

[63] Continuation-in-part of Ser. No. 868,754, Apr. 14, 1992.

[51] Int. Cl.⁵ .............................................. F16L 11/04
[52] U.S. Cl. .................................... 138/121; 138/103; 138/104; 138/122; 138/137; 138/125; 138/126; 174/47; 361/215
[58] Field of Search ............... 138/124, 125, 126, 127, 138/137, 140, 141, 177, 103, 104, DIG. 1, DIG. 3, DIG. 7, 121, 122; 428/36.91; 361/215; 174/47

[56] References Cited

U.S. PATENT DOCUMENTS

| | | | |
|---|---|---|---|
| 3,070,132 | 12/1962 | Sheridan | 361/215 |
| 3,473,087 | 10/1969 | Slade | 138/103 |
| 3,561,493 | 2/1971 | Maitlord et al. | 138/137 |
| 3,828,112 | 8/1974 | Johansen et al. | 138/127 |
| 3,907,955 | 9/1975 | Viennot | 174/47 |
| 4,059,847 | 11/1977 | Phillips et al. | 361/215 |
| 4,685,090 | 8/1987 | Krevor | 138/137 |
| 5,038,833 | 8/1991 | Brunnhofer | 138/137 |
| 5,076,329 | 12/1991 | Brunnhofer | 138/137 |
| 5,167,259 | 12/1992 | Brunnhofer | 138/137 |
| 5,170,011 | 12/1992 | Martucci | 138/137 |

Primary Examiner—James E. Bryant, III
Attorney, Agent, or Firm—Robert P. Seitter; J. Gordon Lewis

[57] ABSTRACT

A multi-layer tube suitable for use on motor vehicles composed of a cylindrical wall having an outer surface, and an inner surface essentially parallel to the outer surface. The cylindrical wall has a first region having an essentially uniform cross-sectional diameter and a second region which has a cross-sectional diameter differing from the essentially uniform cross-sectional diameter of the first region. The second region has at least one convolution contiguously adjacent to the cylindrical wall of the first region. The cylindrical wall is made up of a thick flexible outer layer having an inner and an outer face, composed of an extrudable melt processible thermoplastic; a thin intermediate bonding layer bonded to the inner face of the thick outer layer, composed of an extrudable melt processible thermoplastic capable of sufficiently permanent laminar adhesion to the outer layer; and an inner hydrocarbon barrier layer bonded to the intermediate bonding layer, composed of an extrudable melt processible thermoplastic which contains a fluoroplastic such as polyvinylidine fluoride, polyvinylfluoride, polychlorotrifluoroethylene, ethylene tetrafluoroethylene copolymers, and mixtures thereof.

29 Claims, 1 Drawing Sheet

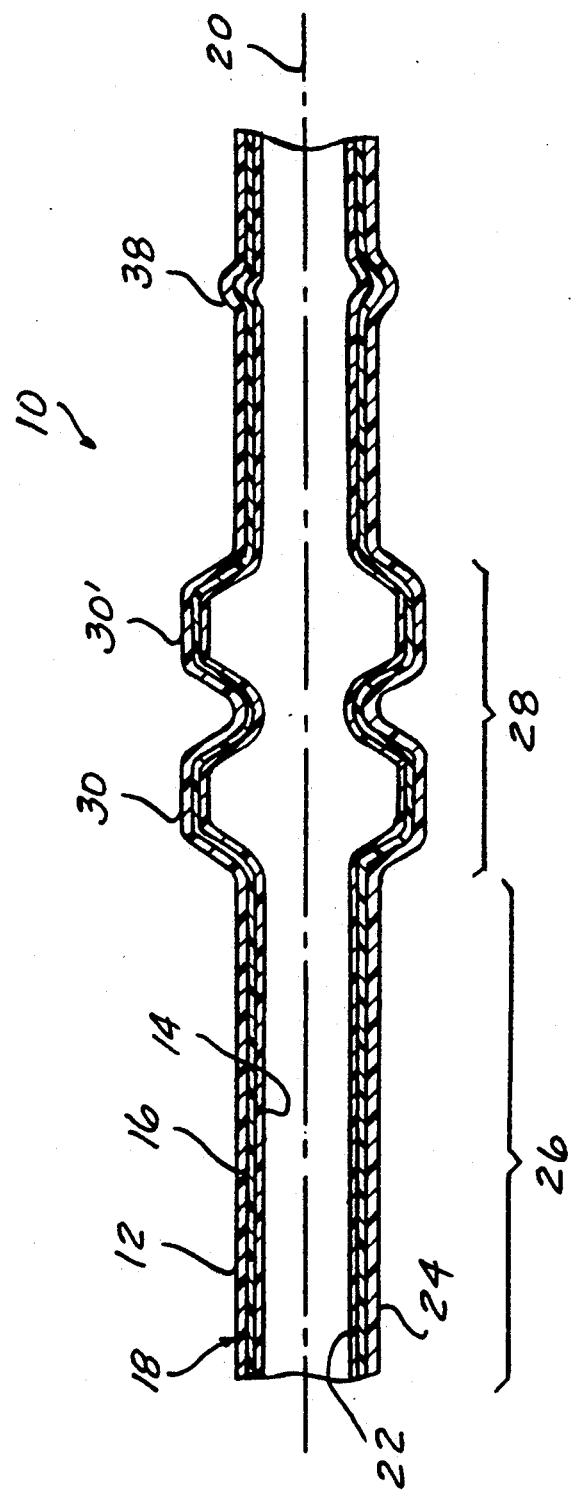

CORRUGATED MULTI-LAYER TUBING HAVING AT LEAST ONE FLUOROPLASTIC LAYER

RELATED APPLICATIONS

This application is a continuation-in-part of Ser. No. 07/868,754, filed Apr. 14, 1992 currently pending before the United States Patent and Trademark Office. This application is one of two applications which are being dispatched for filing in the United States Patent and Trademark Office on Oct. 16, 1992. The other application can be identified by our reference number Noone-8.

1. Field of the Invention

The present invention relates to a corrugated tubing. More particularly, the present invention relates to multilayer tubing having at least one region of corrugation.

2. Background of the Invention

Single layer fuel lines and vapor return lines manufactured from synthetic materials such as polyamides have been proposed and employed in the past. Fuel lines employing such materials generally have lengths of at least several meters. It is important that the line, once installed, not materially change during the length of operation, either by shrinkage or elongation or as a result of the stresses to which the line may be subject during use.

It is also becoming increasingly important that the lines employed be essentially impervious to hydrocarbon emissions due to permeation through the tubing. It is anticipated that future Federal and state regulations will fix the limit for permissible hydrocarbon emissions due to permeation through such lines. Regulations which will be enacted in states such as California will fix the total passive hydrocarbon emission for a vehicle at 2 $g/m^2$ per 24 hour period as calculated by evaporative emission testing methods such as those outlined in Title 13 of the California Code of Regulations, section 1976, proposed amendment of Sep. 26, 1991. To achieve the desired total vehicle emission levels, a hydrocarbon permeation level for the lines equal to or below 0.5 $g/m^2$ per 24 hour period would be required.

Finally, it is also imperative that the fuel line employed be impervious to interaction with corrosive materials present in the fuel such as oxidative agents and surfactants as well as additives such as ethanol and methanol.

Various types of tubing have been proposed to address these concerns. In general, the most successful of these have been co-extruded multi-layer tubing which employ a relatively thick outer layer composed of a material resistant to the exterior environment. The innermost layer is thinner and is composed of a material which is chosen for its ability to block diffusion of materials such as aliphatic hydrocarbons, alcohols and other materials present in fuel blends, to the outer layer. The materials of choice for the inner layer are polyamides such as Nylon 6, Nylon 6.6, Nylon 11, and Nylon 12.

Alcohol and aromatic compounds in the fluid conveyed through the tube diffuse at different rates through the tubing wall from the aliphatic components. The resulting change in the composition of the liquid in the tubing can change the solubility thresholds of the material so as, for example, to be able to crystalize monomers and oligomers of materials such as Nylon 11 and Nylon 12 into the liquid. The presence of copper ions, which can be picked up from the fuel pump, accelerates this crystallization. The crystallized precipitate can block filters and fuel injectors and collect to limit travel of the fuel-pump or carburetor float as well as build up on critical control surfaces of the fuel pump.

In U.S. Pat. No. 5,076,329 to Brunnhofer, a five-layer fuel line is proposed which is composed of a thick corrosion-resistant outer layer formed of a material known to be durable and resistant to environmental degradation such as Nylon 11 or Nylon 12. The tubing disclosed in this reference also includes a thick intermediate layer composed of conventional Nylon 6. The outer and intermediate layers are bonded together by a thin intermediate bonding layer composed of a polyethylene or a polypropylene having active side chains of maleic acid anhydride. An thin inner layer of aftercondensed Nylon 6 with a low monomer content is employed as the innermost region of the tubing. The use of Nylon 6 as the material in the inner fluid contacting surface is designed to eliminate at least a portion of the monomer and oligomer dissolution which would occur with Nylon 11 or Nylon 12. The thin innermost layer is bonded to the thick intermediate layer by a solvent blocking layer formed of a copolymer of ethylene and vinyl alcohol with an ethylene content between about 30% and about 45% by weight. The use of a five layer system was mandated in order to obtain a tubing with the impact resistance of Nylon 12 with the low monomer/oligomer production of Nylon 6. It was felt that these characteristics could not be obtained in a tubing of less than five layers.

In U.S. Pat. No. 5,038,833 also to Brunnhofer, a three-layer fuel line without the resistance to monomer/oligomer dissolution is proposed in which a tube is formed having a co-extruded outer wall of Nylon 11 or Nylon 12, an intermediate alcohol barrier wall formed from an ethylene-vinyl alcohol copolymer, and an inner water-blocking wall formed from a polyamide such as Nylon 11 or Nylon 12. In DE 40 06 870, a fuel line is proposed in which an intermediate solvent barrier layer is formed of unmodified Nylon 6.6 either separately or in combination with blends of polyamide elastomers. The internal layer is also composed of polyamides, preferably modified or unmodified Nylon 6. The outer layer is composed of either Nylon 6 or Nylon 12.

Another tubing designed to be resistant to alcoholic media is disclosed in UK Application Number 2 204 376 A in which a tube is produced which has an thick outer layer composed of 11 or 12 block polyamides such as Nylon 11 or Nylon 12 which may be used alone or combined with 6 carbon block polyamides such as Nylon 6 or 6.6 Nylon. The outer layer may be co-extruded with an inner layer made from alcohol-resistant polyolefin co-polymer such as a co-polymer of propylene and maleic acid.

Heretofore it has been extremely difficult to obtain satisfactory lamination characteristics between dissimilar polymer layers. Thus all of the multi-layer tubing proposed previously has employed polyamide-based materials in most or all of the multiple layers. While many more effective solvent-resistant chemicals exist, their use in this area is limited due to limited elongation properties, strength and compatibility with Nylon 11 and 12.

In order to overcome these problems, multi-layer tubing material employing chemically different layers has been proposed in co-pending applications Ser. Nos. 07/897,302, 07/897,376 and 07/897,824 to Noone and Mitchell, the inventors of the present invention. These tubing materials generally employ an outer polyamide layer bonded to an inner hydrocarbon resistant layer by means of a suitable intermediate bonding layer. While such materials do provide the desired characteristics of resistance to hydrocarbon permeation, the tubing produced is generally straight material which is difficult to successfully bend to conform to the contours in an automotive vehicle.

In most automotive applications, the tubing employed must be capable of bending to a variety of angles throughout its length to conform to the layout and the space requirements in the specific vehicle design. Various polymeric materials possess significant elastic memories which makes it difficult to successfully bend pieces of tubing into the permanent shape or contours necessary in the particular automotive application. Other polymeric materials are too rigid so that bends introduced into the material will cause crimping; thereby restricting flow therethrough and can experience significant reductions in its useful life due to fatigue and stress at or near the bend region. Furthermore bending previously known tubing can cause the differing layers to delaminate or fail due, in part, to the fact that the various layers each have very different elasticity and fatigue characteristics.

In order to obviate this problem, it has been proposed that conventional monolayer tubing be corrugated at the appropriate bend regions. The bend region may include a plurality of annularly oriented accordion-like pleats which permit the region in which the pleats are located to be bent without constricting the interior opening or posing undue stress on the tubing material. This is accomplished by compressing one side of each of the annular pleats in on themselves while the opposing side of each of the annular pleats can be extended outwardly from one another to accommodate the necessary angular contour. Heretofore no corrugated multi-layer tubing has been produced which incorporates chemically different layer materials in a single uniformly laminated wall.

Additionally, up to now, no material has been produced which incorporates characteristics of electrostatic dissipation in a corrugated tubing. Additionally no corrugated tubing has been produced or suggested which incorporates multiple layers of polymeric material having differing differing chemical properties. Without being bound to any theory, it is believed that conventional extrusion and tube forming processes are incapable of producing such material; particularly corrugated tubing having wall thicknesses below about 0.75 mm.

It would be desirable to provide a tubing material which could be employed in motor vehicles which would be durable and prevent or reduce permeation of organic materials therethrough. It would also be desirable to provide a tubing material which would be essentially nonreactive with components of the liquid being conveyed therein. It would be desirable to provide a tubing material which can easily be rendered capable of preventing the build-up of electrostatic discharge either in an operation simultaneous with the tube formation or in a post-processing step or would be capable of safely dissipating any electrostatic charge induced therein. It would also be desirable to provide a tubing material which exhibits these characteristics which has localized or overall areas of corrugation.

SUMMARY OF THE INVENTION

The present invention is a multi-layer tube suitable for use on motor vehicles which is composed of a cylindrical wall which has an outer surface, and an inner surface essentially parallel to the outer surface which defines an essentially cylindrical interior opening extending longitudinally through the tube. The cylindrical wall is characterized by a first region in which the cylindrical wall is essentially parallel to a longitudinal axis running coaxially through the cylindrical interior.

Contiguous to the first region is a second region which is defined by at least one convolution in the cylindrical wall. Each convolution, comprises a region of cylindrical wall which deviates from the flat planar surface defined in the first region. Thus, the first region is defined by flat cylindrical region having an essentially uniform cross-sectional diameter, while the second region which has a cross-sectional which varies depending on the given position on its length and has a diameter different from the essentially uniform cross-sectional diameter of the first region. The cylindrical wall of the tubing of the present invention comprises:

a thick flexible outer layer having an inner and an outer face, the outer layer consisting essentially of an extrudable melt processible thermoplastic having an elongation value of at least 150% and an ability to withstand impacts of at least 2 ft/lbs at temperatures below about $-20°$ C.;

a thin intermediate bonding layer bonded to the inner face of the thick outer layer, the bonding layer consisting essentially of an extrudable melt processible thermoplastic capable of sufficiently permanent laminar adhesion to the outer layer; and an inner hydrocarbon barrier layer bonded to the intermediate bonding layer, the inner layer consisting of an extrudable melt processible thermoplastic capable of sufficiently permanent laminar adhesion with the intermediate bonding layer, the thermoplastic containing as a major constituent a fluoroplastic selected from the group consisting of polyvinylidine fluoride, polyvinylfluoride, polychlorotrifluoroethylene, ethylene tetrafluoroethylene copolymers, and mixtures thereof.

In the preferred embodiment of this invention, the corrugated tubing is also capable of dissipating electrostatic energy, the electrostatic dissipation capacity being in a range between about $10^{-4}$ to $10^{-9}$ ohm/cm$^2$.

DESCRIPTION OF THE DRAWING

The objects, features and advantages of the present invention will become more readily apparent from the following description, reference being made to the following drawing in which the FIGURE is a sectional view through a piece of tubing of the present invention.

DESCRIPTION OF THE PREFERRED EMBODIMENT

The present invention is a multi-layer fuel line and vapor tube which contains at least one bonding layer and at least an outer and an inner tubing layer. The tubing of the present invention is defined by at least one corrugated region located in its length to accommodate bending, flexing or twisting. The multilayer tubing with localized corrugated regions can be produced by a process in which linear tubing material having multiple laminated layers is formed by co-extrusion and is molded to provide the corrugation and contour desired.

The tubing may either be co-extruded to a suitable length or may be co-extruded in continuous length and cut to fit the given application subsequently. The tubing of the present invention may have an outer diameter up to 50 mm. However, in applications such as fuel lines and vapor recovery systems, outer diameter of up to 2 inches are preferred.

The material may have any suitable wall thickness desired. However, in automotive systems such as those described herein, wall thicknesses between 0.5 mm and 2.0 mm are generally employed with wall thicknesses of approximately 0.8 to 1.5 Mm being preferred. While it is within the scope of this invention to prepare a tubing material having a plurality of overlaying layers of various thermoplastic materials, the tubing of the present invention generally has a maximum of five layers inclusive of the bonding layers. In the preferred embodiment, the tubing material has three or four.

The tubing 10 of the present invention is a material which is suitable for use in motor vehicles and comprises a relatively thick outer layer 12 which is non-reactive with the external environment and can withstand various shocks, vibrational fatigue, and changes in temperature as well as exposure to various corrosive or degradative compounds to which it would be exposed through the normal course of operation of the motor vehicle.

It is anticipated that both the outer tubing layer 12 as well as any interior layers bonded thereto would be suitable for use at an outer service temperature range between about $-40°$ C. and about 150° C., with a range of $-20°$ C. to 120° C. being preferred. The various layers of tubing are integrally laminated to one another and resistant to delamination throughout the lifetime of the tubing. The tubing of the present invention thus formed will have a tensile strength of no less than 25N/mm$^2$ and an elongation value of at least 150%. The tubing will have a burst strength at 23° C. and 120° C. of at least 20 bar. The multi-layer tubing of the present invention is sufficiently resistant to exposure to brake fluid, engine oil and peroxides such as those which may be found in gasoline.

The outer layer 12 may be composed of any melt-processible extrudable thermoplastic material which is resistant to ultra violet degradation, extreme changes in heat and exposure to environmental hazards such as zinc chloride, and degradation upon contact with engine oil and brake fluid. In general, the exterior layer is selected from the group consisting of 12 carbon block polyamides, 11 carbon block polyamides as well as zinc chloride resistant 6 carbon block polyamides thermoplastic elastomers. These thermoplastic elastomers are proprietary compositions and commercially available under tradenames such as SANTOPRENE, KRATON, SARLINK and VICHEM. These materials which compose the outer layers can be present in their unmodified state or can be modified with various plasticizers, flame retardants and the like in manners which would be known to one reasonably skilled in the art.

In the preferred embodiment, a polyamide such as Nylon 12 can be effectively employed. It is anticipated that the Nylon 12 may be either modified or unmodified. If modified, it is anticipated that the material will contain various plasticizers as are readily known in the art.

The Nylon 12 outer layer 12 preferably has a wall thickness between about 0.5 mm and about 0.9 mm with a preferred range being between about 0.7 and about 0.8 mm. As indicated previously, the material is extruded by conventional co-extrusion methods to any continuous length desired.

In the method of the present invention, the Nylon 12 is continuously extruded from a suitable coextrusion head with a wall thickness sufficient to accommodate localized expansion and elongation in molded and contoured regions. The contoured regions may be or experience a degree of localized stretching or thinning but will have sufficient initial thickness to withstand the expansion without compromising the integrity of the multilayer wall structure. In the preferred embodiment, the outer layer is extruded to an initial wall thickness between about 0.5 and about 2.5 mm with a preferred thickness between about 0.75 mm and about 1.25 mm.

The inner layer 14 is integrally bonded to the inner surface of the thick outer polyamide layer 12. In the present invention, the inner layer 14 is a permeation resistant, chemical resistant, fuel resistant thermoplastic material which is melt processible in normal ranges of extrusion, i.e. about 175° to about 250° C. The material employed is, preferably, a material which is completely dissimilar to the material employed in the outer layer. By the term "completely dissimilar" it is meant that the inner layer 14 is a non-polyamide material which is capable of adhesion to a bonding layer interposed between the thick outer layer and the inner layer in a manner which will be described subsequently.

The material employed in the corrugated tubing of the present invention will generally have a minimum elongation value of about 150%; with elongation values between about 150% to about 250% being preferred.

Where a completely dissimilar material is employed, the thermoplastic material which comprises the inner layer is selected from the group consisting of polyvinylidine fluoride, polyvinylfluoride, polychlorotrifluoroethylene, ethylene tetrafluoroethylene copolymers, and mixtures thereof. The preferred material may be a polyvinylidine fluoroplastic derived from the thermal dehalogenation of chlorodifluoroethane commercially available under the tradenames "FLORAFLON" and "KYNAR" from Atochem Inc. elf Aquitaine Group of Philadelphia, Pa. Alternately, the preferred material may be an ethylene tetrafluoroethylene copolymer having a melt temperature between about 270° C. and 560° C. and a specific gravity of 1.7. The ethylene tetrafluoroethylene copolymer which can be successfully employed herein is derived from the copolymerization of ethylene with tetrafluoroethylene. The preferred polymeric material has an ethylene-derived content between about 40% and about 70% and a tetrafluoroethylene content between about 30% and about 40% by total polymer weight and is commercially available under the tradenames "TEFZEL 210". "TEFZEL 200", and "TEFZEL 280" from I. G. dupont de Nemours, Inc. of Wilmington, Del.

The thermoplastic material employed in the inner layer is capable of serving as a hydrocarbon barrier to prevent significant permeation of the aromatic and aliphatic components of gasoline through to the polyamide outer layer of the tubing and thus, out to the surrounding environment.

In the preferred embodiment, the inner layer 14 is composed of a fluoroplastic material, it may also exhibit conductive characteristics in that it is capable of dissipation of electrostatic charge in the range of $10^{-4}$ to $10^{-9}$ ohm/cm$^2$. The fluoroplastic material employed in the present invention may be inherently conductive in these ranges or, preferably, includes in its composition a conductive media in sufficient quantity to permit electrostatic dissipation in the range defined. The conductive media may be any suitable material of a composition and shape capable of effecting this static dissipation. The conductive material may be selected from the group consisting of elemental carbon, stainless steel and highly conductive metals such as copper, silver, gold, nickel, silicon and mixtures thereof. The term "elemental carbon" as used herein is employed to describe and include materials commonly referred to as "carbon black". The carbon black can be present in the form of carbon fibers, powders, spheres, and the like.

The amount of conductive material contained in the fluoroplastic is generally limited by considerations of low temperature durability and resistance to the degradative effects of the gasoline or fuel passing through the tubing. In the preferred embodiment, the fluoroplastic material contains conductive material in an amount sufficient to effect electrostatic dissipation. However, the maximum amount employed therein is less than 5% by volume.

The conductive material can either be interstitially integrated into the crystalline structure of the polymer or can be introduced during polymerization of the polymer. Without being bound to any theory, it is believed that carbon-containing materials such as carbon black may be introduced during co-polymerization of the surrounding fluoroplastic material. Material such as stainless steel is more likely to be interstitially integrated into the crystalline structure of the polymer.

The material employed in the inner layer generally has a degree of expansion greater than that of the outer layer. In general, the elongation value of the inner layer is between about 150% and about 200%. The material generally has an elastic memory which can result in the contraction of the material to about 200% of its elongated value upon stretching or other deformative activities.

Preferably, the inner layer 14 has a thickness sufficient to provide the corrugated tube of the present invention with a barrier layer which will prevent appreciable permeation of organic material such as hydrocarbons through the tubing material. It is preferred that the amount of hydrocarbon permeation be no greater than 0.5 gm/m$^2$ in a 24 hour interval. In the preferred embodiment, the inner layer has a thickness between about 0.05 mm and about 0.2 mm with a thickness of about 0.05 mm to about 0.17 Mm being preferred.

In order to accomplish effective lamination of the two dissimilar materials, the tubing of the present invention also includes at least one intermediate layer 16 interposed between the two previously described layers and co-extruded therewith which is capable of achieving a suitable homogeneous bond between itself and the two respective layers. The intermediate bonding layer 16 is generally composed of a more elastic material than that employed in the inner layer.

In the preferred embodiment, the intermediate bonding layer 16 is composed of a thermoplastic material which also exhibits properties of resistance to permeation of aliphatic and aromatic materials such as those found in fuel. The thermoplastic material employed herein is preferably a melt-processible co-extrudable thermoplastic which may or may not contain various plasticizers and other modifying agents. The material employed in the composition of the intermediate bonding layer 16 will, preferably have a minimum elongation value of 150%; with values between about 150% and about 250% being preferred. The intermediate bonding layer 16 is, preferably, a thermoplastic selected from the group consisting of polyvinylidine fluoride, polyvinyl fluoride, polyvinyl acetate-urethane blends, and mixtures thereof which exhibits an infinity to conventional polymers such as Nylon 12. One preferred fluoroplastic material is a polyvinylidine derived from the thermal dehalogenation of chlorodifluoroethane. One preferred non-fluorocarbon material is a polyvinyl acetate/urethane blend. The material of choice exhibits an affinity to conventional polymers such as Nylon 12. Suitable fluoroplastic materials are commercially available under the tradename "ADEFLON A"; while suitable non-fluoroplastic materials are commercially available under the tradename "ADEFLON D" from Atochem Inc. elf Aquitaine Group of Philadelphia, Pa.

The intermediate bonding layer 16, in addition to permitting a homogeneous bond between the inner and outer layers and exhibiting resistance to permeation of fuel components, also may exhibit conductive or static dissipative characteristics such as those described previously. Thus, the intermediate bonding layer 16 may optionally include sufficient amounts of a conductive media to effect electrostatic dissipation in the range of $10^{-4}$ to $10^{-9}$ ohm/cm$^2$. As with the inner layer, the intermediate bonding layer may be inherently electrostaticly dissipative or may be rendered so by the inclusion of certain conductive material such as those selected from the group consisting of elemental carbon, stainless steel, copper, silver, gold, nickel, silicon and mixtures thereof.

In the preferred embodiment, the intermediate bonding layer 16 is preferably maintained at the minimum thickness necessary to achieve effective bonding between the inner and outer layers. Furthermore, the intermediate bonding layer can also function in concert with the inner layer to prevent permeation of the fuel through the tubing material. As indicated previously, it is preferred that the amount of hydrocarbon permeation not exceed 0.5 gm/m$^2$ in a 24 hour interval. Thus where the bonding layer contributes to permeation resistance, it is anticipated that the thickness of the inner and intermediate layers can be modified to accomplish this end. The intermediate bonding layer 16 generally has a thickness between about 0.05 mm and about 0.2 mm; with a thickness between about 0.05 mm and about 0.15 mm being preferred.

In addition to permitting the establishment of a homogeneous bond between the inner and outer layers, the intermediate bonding layer can also exhibit resistance to the permeation of aliphatic and aromatic compounds therethrough. Furthermore the intermediate bonding layer may exhibit conductive or static dissipative characteristics such as those described previously. Thus the intermediate bonding layer may optionally include sufficient amounts of conductive media to effect electrostatic dissipation in the range of $10^{-4}$ to $10^{-9}$ ohm/cm$^2$. As with the inner layer, the intermediate bonding layer may be inherently electrostatically dissipative or may be rendered so by the inclusion of certain conductive materials such as those selected from the group consisting of elemental carbon, stainless steel, copper, silver, gold, nickel, silicon, and mixtures thereof.

The multilayer tube 10 of the present invention is composed of an elongated cylindrical wall 18 which preferably has an essentially circular cross-section perpendicular to its longitudinal axis 20. The cylindrical wall 18 has an essentially uniform wall thickness throughout its length and circumference and is defined by an inner surface 22 and an opposed outer surface 24. The inner surface 22 defines an essentially cylindrical opening which, in the tubing's unbent condition, extends longitudinally through the tubing 10 of the present invention essentially coaxial to the longitudinal axis 20.

The cylindrical wall 18 of the multi-layer tube 10 comprises at least two distinct regions. The cylindrical wall has a first region 26 in which the cylindrical wall 18 remains essentially parallel to the longitudinal axis 20. Contiguous to the first region 26 is a second region 28 which is defined by at least one convolution 30 located in the cylindrical wall 18. As used herein, the term convolution is defined as an area of cylindrical wall 18 which deviates outward from a position parallel to the longitudinal axis 20. This deviation can produce an inner diameter which is between about 20% and 300% greater than the inner diameter of the first region 26 at its maximum. In the preferred embodiment, the inner diameter of the convolution 30 is between 20% and 100% greater than the inner diameter of the first region 26.

The tubing 10 of the present invention can have as many convolutions with any length of cylindrical tubing optionally interposed therebetween as would be necessary to achieve the degree of flexibility required. The geometry of the convolutions can be of any cross-sectional profile desired. Thus the convolutions 30 may have angled, squarea, or sinusoidal profiles as desired. In the preferred embodiment, it is anticipated that the tubing of the present invention will have sufficient convolutions positioned on the length of the tubing to accommodate bends of over 90° from vertical. It is to be understood that the tubing 10 of the present invention can be customized to suit the end user. Thus, in situations were such acute bends are not required, the tubing can has fewer or shallower convolutions.

In effecting a bend such as an angular bend in the tubing 10 of the present invention, a longitudinal area on one side of the second region 26 can be compressed so that the segments of the various convolutions 30 are brought into lateral contact with one another while the diametrically opposed longitudinal area is reciprocally elongated.

The tubing 10 may also include various molded flanges and the like such as hose barb 38 shown in the FIGURE. It is to be understood that in hose barb 38, as in all molded regions, the wall thickness remains essentially constant linearly throughout the outwardly expanded region as do the relative thicknesses of the various multiple layers.

Thus the present invention is a multi-layer tubing material which can accommodate the introduction of various bends and contours during installation. The material of the present invention is fuel resistant to fuel permeation and can permit dissipation of electrostatic discharge.

What is claimed is:

1. A multi-layer tube suitable for use on motor vehicles comprising a cylindrical wall having an outer surface, and an inner surface essentially parallel to the outer surface, the inner surface defining an essentially cylindrical interior, said essentially cylindrical interior extending longitudinally through the tube coaxial to a longitudinal axis, the cylindrical wall itself comprising:

a first region having an essentially uniform cross-sectional diameter in which the cylindrical wall has a flat in longitudinal cross-section, the cylindrical wall oriented essentially parallel to the coaxial longitudinal axis; and a second region in which the cylindrical wall has at least one convolution having a cross-sectional diameter which varies positionally depending on longitudinal location in the second region, the convolution having cross-sectional diameter different from the essentially uniform cross-sectional diameter of the first region, the cylindrical wall of the multi-layer tubing further comprising:

a thick flexible outer layer having an inner and an outer face, the outer layer consisting essentially of an extrudable melt processible thermoplastic having an elongation value of at least 150% and an ability to withstand impacts of at least 2 ft/lbs at temperatures below about −20° C.;

a thin intermediate bonding layer bonded to the inner face of the thick outer layer, the bonding layer consisting essentially of an extrudable melt processible thermoplastic capable of sufficiently permanent laminar adhesion to the outer layer; and an inner hydrocarbon barrier layer bonded to the intermediate bonding layer, the inner layer consisting of an extrudable melt processible thermoplastic capable of sufficiently permanent laminar adhesion with the intermediate bonding layer, the thermoplastic containing as a major constituent a fluoroplastic material selected from the group consisting of polyvinylidine fluoride, polyvinylfluoride, polychlorotrifluoroethylene, ethylene tetrafluoroethylene copolymers, and mixtures thereof.

2. The tubing as defined in claim 1 wherein the inner diameter of the convolution located in the second region of the cylindrical wall is between about 20% and about 300% greater than the inner diameter of the first region.

3. The tubing as defined in claim 2 wherein the cylindrical diameter of the convolution is between about 20% and about 100% greater than the inner diameter of the first region.

4. The tubing of claim 2 wherein the convolution has an angled longitudinal cross-sectional profile.

5. The tubing of claim 2 wherein the convolution has a squared longitudinal cross-sectional profile.

6. The tubing of claim 2 wherein the convolution has a sinusoidal longitudinal cross-sectional profile.

7. The tubing of claim 2 wherein the outer diameter of the first region is less than about 2.0 inches.

8. The tubing of claim 1 wherein the inner hydrocarbon layer is capable of dissipating electrostatic energy, the electrostatic dissipation capacity being in a range between about $10^{-4}$ to $10^{-9}$ ohm/cm$^2$.

9. The tubing of claim 1 wherein the thermoplastic material employed in the inner hydrocarbon barrier layer has a minimum elongation value of about 150%.

10. The tubing of claim 9 wherein the inner hydrocarbon barrier layer has an elongation value between about 150% and about 250%.

11. The tubing of claim 1 wherein said outer layer is composed of a thermoplastic material selected from the group consisting of twelve-carbon block polyamides, eleven-carbon block polyamides, six-carbon block polyamides, thermoplastic elastomers, and mixtures thereof.

12. The tubing of claim 1 wherein the inner hydrocarbon layer is capable of dissipating electrostatic energy, the electrostatic dissipation capacity being in a range between about $10^{-4}$ to $10^{-9}$ ohm/cm$^2$.

13. The tubing of claim 12 wherein inner layer contains a conductive material capable of dissipating electrostatic energy, the conductive material being selected from the group consisting of elemental carbon, copper, silver, gold, nickel, silicon, and mixtures thereof.

14. The tubing of claim 13 wherein the conductive material is present in an amount less than about 5% by volume of the fluoroplastic material.

15. The tubing of claim 13 wherein the conductive material is blended into the fluoroplastic material.

16. The tubing of claim 11 wherein the conductive material is elemental carbon and is incorporated during polymerization of monomers that make up the extrudable fluoroplastic material.

17. The tubing of claim 1 wherein the extrudable thermoplastic of the thick outer tubing is a polyamide selected from the group consisting of Nylon 11, Nylon 12, zinc chloride resistant Nylon 6, and mixtures thereof.

18. The tubing of claim 1 wherein the thermoplastic material employed in the intermediate bonding layer has an elongation value of at least 150%.

19. The tubing of claim 1 wherein the thermoplastic material employed in the intermediate bonding layer exhibits at least some resistance to interaction with short-chain hydrocarbon molecules present in material conveyed through the tubing.

20. The tubing of claim 17 wherein the thermoplastic material employed in the intermediate bonding layer has an elongation value of at least 150% and includes as a major constituent an extrudable, melt processible fluoroplastic selected from the group consisting of polyvinylidine fluoride, polyvinyl fluoride, and mixtures thereof.

21. A multi-layer tube suitable for use on motor vehicles comprising a cylindrical wall having an outer surface, and an inner surface essentially parallel to the outer surface, the inner surface defining an essentially cylindrical interior, said essentially cylindrical interior extending longitudinally through the tube coaxial to a longitudinal axis, the cylindrical wall itself comprising:
a first region having an essentially uniform cross-sectional diameter in which the cylindrical wall has a flat in longitudinal cross-section, the cylindrical wall oriented essentially parallel to the coaxial longitudinal axis; and
a second region in which the cylindrical wall has at least one convolution having a cross-sectional diameter which varies positionally depending on longitudinal location in the second region, the convolution having cross-sectional diameter different from the essential uniform cross-sectional diameter of the first region and has a maximum inner diameter which is between about 20% and about 300% greater than the essentially uniform cross-sectional inner diameter of the first region, the cylindrical wall of the multi-layer tubing further comprising:
an outer tubing having an inner and an outer face, the outer tubing consisting essentially of an extrudable polyamide having an elongation value of at least 150% and an ability to withstand impacts of at least 2 ft/lbs at temperatures below about $-20°$ C.;
an intermediate bonding layer having a thickness between about 0.05 mm and about 0.2 mm and an elongation value between about 150% and about 250%, the intermediate bonding layer bonded to the inner face of the thick outer layer, the bonding layer consisting essentially of an extrudable thermoplastic capable of sufficiently permanent laminar adhesion to the polyamide outer tubing and exhibiting at least some resistance to short-chain hydrocarbon molecules conveyed through the tubing; and
an inner hydrocarbon barrier layer bonded to the intermediate bonding layer having a thickness between about 0.05 m and about 0.2 mm and an elongation value of at least 150%, the inner layer consisting essentially of an extrudable, melt process fluoroplastic capable of sufficiently permanent laminar adhesion with the intermediate bonding layer selected from the group consisting of polyvinylidine fluoride, polyvinyl fluoride, polychlorotrifluoroethylene, ethylene tetrafluoroethylene copolymers, and mixtures thereof.

22. The tubing of claim 21 wherein the extrudable thermoplastic of the thick outer tubing is a polyamide selected from the group consisting of Nylon 11, Nylon 12, zinc chloride resistant Nylon 6, and mixtures thereof.

23. The tubing of claim 21 wherein the thermoplastic material of the inner hydrocarbon barrier layer is capable of dissipating electrostatic energy, the electrostatic dissipation capacity being in a range between about $10^{-4}$ to $10^{-9}$ ohm/cm$^2$.

24. The tubing of claim 21 wherein the thermoplastic material of the inner hydrocarbon barrier layer contains quantities of a conductive material sufficient to provide electrostatic dissipation capacity in a range between about $10^{-4}$ to $10^{-9}$ ohm/cm$^2$.

25. The tubing of claim 23 wherein the conductive material is selected from the group consisting of elemental carbon, copper, silver, gold, nickel, silicon, and mixtures thereof and is present in an amount less than about 5% by volume of the extrudable thermoplastic material.

26. The tubing of claim 23 wherein the conductive material is blended into the melt processible fluoroplastic material.

27. The tubing of claim 23 wherein the conductive material elemental carbon and is incorporated during polymerization of monomers that make up the extrudable fluoroplastic material.

28. The tubing of claim 23 wherein the extrudable thermoplastic of the inner layer is a fluoroplastic selected from the group consisting of polyvinylidine fluoride, polyvinyl fluoride, and mixtures thereof.

29. The tubing of claim 23 wherein the extrudable thermoplastic of the inner layer is a fluoroplastic selected from the group consisting of polychlorotrifluoroethylene, ethylene tetrafluoroethylene copolymers, and mixtures thereof.

* * * * *

UNITED STATES PATENT AND TRADEMARK OFFICE
CERTIFICATE OF CORRECTION

PATENT NO. : 5,284,184  
DATED : February 8, 1994  
INVENTOR(S) : David L. Noone, et al Page 1 of 2

It is certified that error appears in the above-identified patent and that said Letters Patent is hereby corrected as shown below:

Col. 4, line 48, delete "$10^{-4}$ to $10^{-9}$" and insert --$10^4$ to $10^9$--.

Col. 6, line 65, delete "conductive" and insert --dissipation--.

Col. 6, line 66, delete "$10^{-4}$ to $10^{-9}$" and insert --$10^4$ to $10^9$--.

Col. 6, line 68, delete "conductive" and insert --dissipative--.

Col. 8, lines 26 and 58, delete "$10^{-4}$ to $10^{-9}$" and insert --$10^4$ to $10^9$--.

Col. 8, line 54, delete "conductive or".

Col. 10, line 57, delete "$10^{-4}$ to $10^{-9}$" and insert --$10^4$ to $10^9$--.

UNITED STATES PATENT AND TRADEMARK OFFICE
CERTIFICATE OF CORRECTION

PATENT NO. : 5,284,184
DATED : February 8, 1994
INVENTOR(S) : David L. Noone, et al It is certified that error appears in the above-identified patent and that said Letters Patent is hereby corrected as shown below:

Col. 11, line 4, delete "$10^{-4}$ to $10^{-9}$" and insert --$10^4$ to $10^9$--.

Col. 12, lines 36 and 41, delete "$10^{-4}$ to $10^{-9}$" and insert --$10^4$ to $10^9$--.

Signed and Sealed this

Thirty-first Day of March, 1998

*Attest:*

BRUCE LEHMAN

*Attesting Officer*     *Commissioner of Patents and Trademarks*